UNITED STATES PATENT OFFICE.

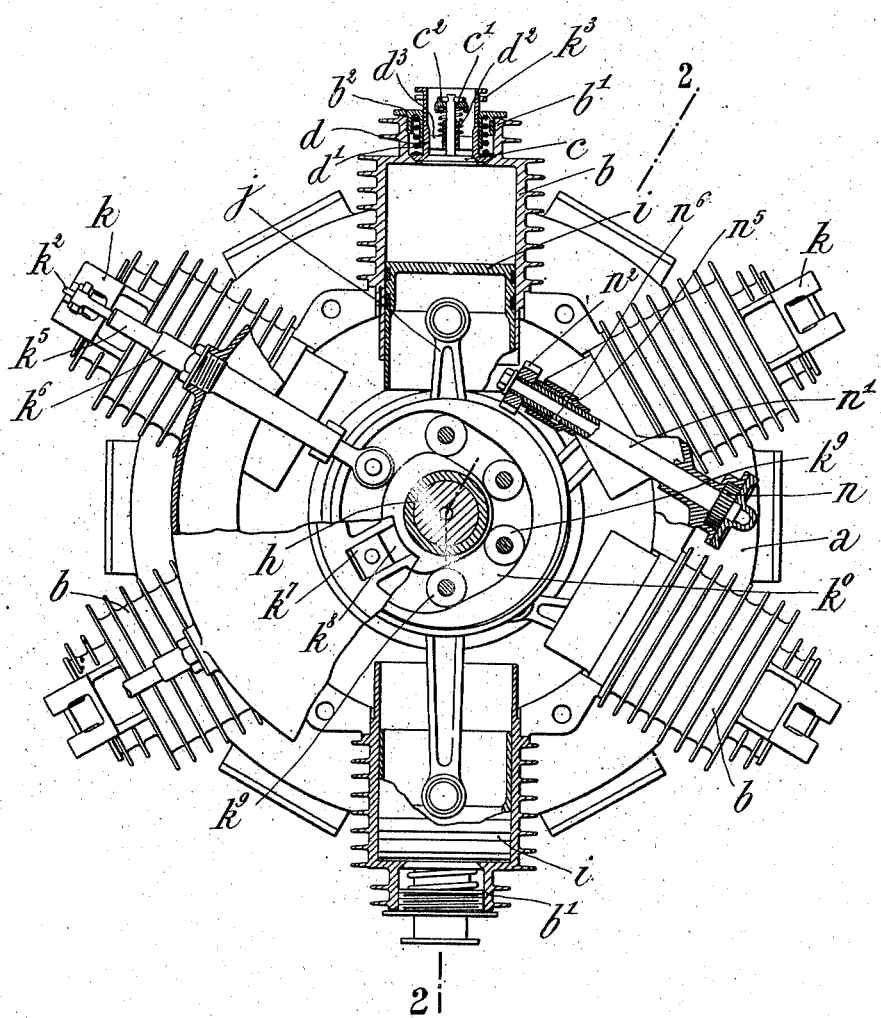

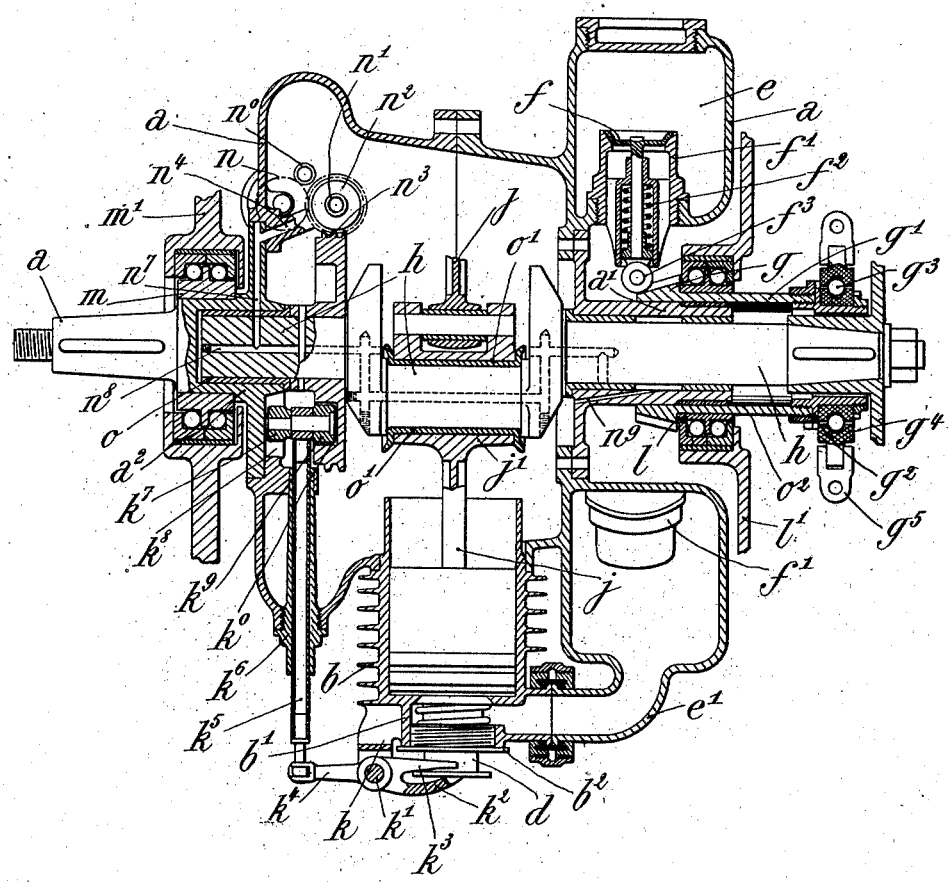

LOUIS GRÉMI, OF PUTEAUX, FRANCE.

COUPLING MECHANISM FOR MOTOR-CARS.

965,814.  Specification of Letters Patent.  Patented July 26, 1910.

Application filed May 5, 1909. Serial No. 494,094.

*To all whom it may concern:*

Be it known that I, LOUIS GRÉMI, engineer, a citizen of the French Republic, residing at 65 Rue Victor Hugo, Puteaux, Seine, France, have invented certain new and useful Improvements in Coupling Mechanism for Motor-Cars; and I do hereby declare the following to be a full, clear, and exact description of the invention, such as will enable others skilled in the art to which it appertains to make and use the same.

A large number of coupling devices and clutches have already been devised for transmitting power, principally applicable for motor cars, but they have not, as a matter of fact, produced fully satisfactory results. Such coupling devices have been constructed so as to be put into operation gradually by forming them, among other ways, with a set of associated friction disks, one set connected rigidly to one member of the transmission mechanism and the other set to the second member; according to a better system the same result has been effected by hydraulic means, comprising a cylindrical reservoir in one with one of the parts, and one or more vanes attached to the second of the said parts and separating the first into a certain number of compartments, with means for the regulation of the intercommunication between the compartments. Again the coupling or clutching mechanism has been rendered elastic, by using ordinary springs, but in no case have the various difficulties encountered been overcome.

The object of the present invention is to overcome the existing drawbacks. The coupling device to which it relates is of such a nature as to satisfy all requirements. It is constructed upon principles somewhat analogous to those adopted in coupling devices known as hydraulic clutches, but it employs in place of an incompressible fluid, an elastic fluid, such for example as air. The coupling consequently possesses two fundamental advantages—it does not require for its elasticity the use of a special means, and contrary to what is the case with hydraulic clutches, since it utilizes air, it is entirely independent of leakage which is of extreme importance especially when motor cars are being dealt with.

The invention will be better understood from the following description and the annexed drawings, which show, merely by way of example, a coupling mechanism constructed on the present system as applied to a clutch for a motor car.

Figure 1 of the drawings is a front elevation of the said coupling mechanism with portions in cross section; Fig. 2 is a longitudinal section on the line 2—2, Fig. 1.

In the method of carrying out the invention, such as that shown by way of example in the drawings, the coupling comprises substantially, the part $a$ which can be attached to one or the other of the two parts of the transmission mechanism, for instance to the fly wheel of the motor or to its equivalent. A certain number of cylinders $b$ mounted radially on the part $a$ are provided on the one hand with inlet valves $c$ and on the other hand with outlet valves $d$.

$e$ is a compression chamber by preference rigidly connected with the said cylinders and connected with the outlet valves $d$. This chamber is provided with an outlet mechanism which is capable of regulation. This regulation may be advantageously effected by one or more valves $f$ so actuated, for instance by a piece $g$, that their position can be altered at will.

$h$ is a crank, the axis of which is concentric with the piece $a$ which crank is capable of being put in connection with the second part of the transmission gear.

$i$ are pistons connected to the said crank by connecting rods $j$ conveniently pivoted on the latter, with the intervention of a collar $j^1$ formed at the end of one of the said connecting rods.

The operation is extremely simple. Supposing for instance in the first place that the valves $c$ and $d$ are automatic in action and that owing to the position in which the piece $g$ is set the valves $f$ are completely open; if the part $a$ has motion communicated to it, the crank shaft $h$ having at the same time a resistance placed upon it, the said shaft remains in its position and the pistons $i$ are drawn into and out of the cylinders. At each forward stroke of the said pistons they compress into the chamber $e$, that is into the atmosphere, because the valves $f$ when they are open, allow of the escape of the air, their size being suitably calculated for that purpose, in the case under consideration. If the parts are in the positions already mentioned and the piece $g$ is so displaced that the said valves $f$ are partly closed, the air accumulates in the chamber $e$ at each forward stroke of the pistons $i$ and cannot escape directly. The pressure of this air progressively increases during the period of pumping of the pistons $i$ and produces a reaction upon these latter and by the intervention of the connecting rods $j$ and of the collar $j^1$ on the crank $h$ this latter is forced to rotate, from which it results that a number of weaker strokes of the pistons $i$ are produced in the cylinders $b$ during the rotation of the shaft caused by that of the part $a$. This causes at each revolution of the said part $a$ less compression in the chamber $e$, where finally the pressure reaches a certain point corresponding at the same time to the degree of opening of the valves $f$ and to a certain rapidity of motion of the shaft $h$. If now the closing of the said valves $f$ is increased there is a fresh increase of pressure in the chamber $e$ and consequently of the velocity of rotation of the crank $h$. If finally the closing is carried to such an extent that the rapidity of rotation is equal to that of the piece $a$ the clutching action is complete and all the parts turn as a whole. In all cases whenever for any reason there is a fall of pressure in the chamber $e$ there is almost immediately a corresponding recuperation of pressure, as will easily be observed. In all cases again if one of the two parts of the transmission gear is subjected to any shock, no damage is produced in the other, since the medium being only a gaseous fluid is perfectly elastic.

The pressure in the chamber $e$ necessary for complete clutching is not the same in all the cases. It is a function of the resistance to which the shaft $h$ is exposed; and it follows that the greater the resistance, the greater must be the said pressure. Now each time the latter rises or falls it can only do so progressively, a fact which is of great importance in motor cars, for there will be an absolute progression in passing from one resistance to another.

If desired the exhaust from the chamber $e$ can be led permanently or otherwise to a suitable motor either of the turbine type or of the cylinder and piston type, which is so mounted that it operates the shaft $h$ or a shaft connected therewith, thus allowing the energy to be utilized which would otherwise be wasted, after the synchronizing of the part $a$ and the shaft $h$, and again the coupling device may be applied not only as a clutch but also as change speed gear. It should also be mentioned with regard to the last point that if the loss of energy produced during the synchronizing of the parts is looked upon as a matter of secondary importance, the coupling in question can still be applied by itself as a change speed gear.

In all cases again, as will be easily understood recourse may be had to a system of rotary pumps for supplying the chamber $e$ instead of a system such as that shown on the drawing.

With regard to the details of arrangement in the case where the valves $c$ and $d$ are actuated and the part $a$ also combined with a lubricating pump; each of the cylinders $b$ is surmounted by a tubular piece $b^1$ which forms at the base a seating for a corresponding outlet valve $d$ and has at the top a tapped portion on to which is screwed an annular cay $b^2$, between which and a part provided for the purpose on the valve $d$ is interposed a spring $d^1$ tending to keep the latter on its seating. The said valve $d$ is also provided with a tubular stem at the base of which is formed a seating of the inlet valve $c$. The latter has its stem mounted in a sleeve $d^2$ provided in the tubular stem of the valve $d$, and fixed there by a bridge piece $d^3$ and surmounted by a cap $c^1$, between which and the said bridge piece is interposed a spring $c^2$ tending to keep the valve in question on its seating.

Each of the cylinders comprises moreover a bracket $k$, on which is pivoted at $k^1$ a rocking lever comprising on the one hand a central finger $k^2$ suitable for pressing on the stem of the valve $c$ so as to open it when it is rocked over toward the axis of the shaft $h$, and to have no effect on the said valve when the lever is rocked over in the opposite direction. On the other hand it has a fork $k^3$ which gives a pull at the extremity of the tubular stem of the valve $d$ so as to raise it when the lever is rocked over toward the outside and not to raise the said valve when the lever is moved in the opposite direction. Finally, there is a supplemental finger $k^4$ extending from the said central finger $k^2$ and actuated by the end of a radial pin $k^5$, placed in a corresponding bearing $k^6$ and ending with a head consisting of a guide $k^7$ sliding backward and forward in a radial guide way $k^8$ provided in the part $a$ and also comprising a roller $k^9$ placed in a cam groove $k^0$, common to all the rollers $k^9$ and furnished in the plate carried by the shaft $h$. The shaping of the said cam groove is advantageously such as that shown at Fig. 1.

The chamber $e$ comprises on the one hand a series of branch pipes $e^1$ leading to the different tubular parts $b^1$, and on the other hand a series of seatings $f^1$ for the valves $f$, each of which has its action controlled by a spring $f^2$ tending to keep it closed, and each of which has its stem terminated by a roller $f^3$ suitable to take motion from the said piece $g$ which is common to all the rollers $f^3$, and is mounted on a tubular extension $a^1$ of the part $a$, forming along with another extension $a^2$ on the same part a bearing bracket for the shaft $h$, so that it can move longitudinally. The piece $g$ is in one with a series of arms $g^1$ passing into corresponding slides formed in the internal ring $l$ of a ball bearing carried by a bracket $l^1$ (corresponding to a similar bearing $m$ carried by a similar bracket $m^1$ on the other side of the apparatus) and connected to a guide $g^2$ controlled through the intervention of another ball bearing $g^3$ and a collar $g^4$ by a fork $g^5$.

With regard to the system of lubrication it consists of a lubricating pump $n$ carried by the part $a$ and provided with a tubular controlling shaft $n^1$ carrying a worm wheel $n^2$ gearing with an endless worm $n^3$ cut on the edge of the plate in which the cam groove $k^0$ is formed; a conducting pipe $n^4$ branching into an annular chamber provided in a sleeve $n^5$ around one of the parts of the shaft $n^1$, at which part this latter is provided with a passage $n^6$; a radial conducting pipe $n^7$ connected with the said conduit $n^4$ and opening into an annular chamber formed in a bush $o$ located in the extension of the piece $a$. A conducting pipe $n^8$ extends along the shaft and has three separate branches, one corresponding to the annular chamber just mentioned, a second which opens into a bush $o^1$ surrounded by the collar $j^1$ and a third which opens a little in front of a supplemental annular chamber provided in a boss $o^2$ located in the extension $a^1$ of the piece $a$. A conducting pipe $n^9$ leads from the said supplemental annular chamber and opens into the casing forming the part $a$. A suitable feed aperture $n^0$ forming the means for supplying the said lubricating pump is suitably located in the said casing, and there is also preferably a device, not shown, for preventing the said pump becoming overcharged, when the mechanism is wholly unclutched.

As will be understood the invention is not limited in any way to the methods of carrying it out which have been previously described, but includes on the contrary all kinds of modifications such for example as those in which the chamber $e$ would be entirely separated from the part $a$.

What I claim and desire to secure by Letters Patent of the United States of America, is:—

1. A fluid-operated clutch comprising, in combination, a driving part and a driven part, one of said parts being provided with a pump cylinder and a pressure chamber communicating with said cylinder; a piston working in said cylinder and connected to the other part; an exhaust valve for closing communication between said cylinder and chamber; an inlet valve connected with the cylinder; a timing mechanism for opening said inlet and exhaust valves; and a separate mechanism for controlling the flow of the operating fluid from said chamber.

2. A fluid-operated clutch comprising, in combination, a driving part and a driven part, one of said parts being provided with a plurality of pump cylinders and a pressure chamber in communication therewith; a piston working in each cylinder and connected to the other part; an exhaust valve and an inlet valve connected with each cylinder, the exhaust valves being arranged to close communication between the cylinder and the pressure chamber; a timing mechanism carried by the driving part and connected with the driven part and with said inlet and exhaust valves, for opening the same; and a separate mechanism for controlling the flow of the operating fluid from said chamber.

3. A fluid-operated clutch comprising a driving part and a driven part, one of said parts being provided with a plurality of pump cylinders and a pressure chamber communicating therewith; a piston working in each cylinder and connected to the other part; an exhaust valve and an inlet valve connected to each cylinder, said exhaust valves being arranged to close communication between said cylinders and chamber; a valve located within said chamber for controlling the flow of the operating fluid therefrom; and a member slidable upon the driven part and arranged for contact with the stem of the last-mentioned valve, for opening the latter.

4. A fluid-operated clutch comprising a driving part and a driven part, one of said parts being provided with a plurality of pump cylinders and a pressure chamber communicating therewith; a piston working in each cylinder and connected to the other part; an exhaust valve and an inlet valve connected to each cylinder, said exhaust valves being arranged to close communication between said cylinders and chamber; spring-pressed valves located within said chamber for controlling the flow of the operating fluid therefrom; a roller secured to the stem of each last-mentioned valve; and a beveled member slidable upon the driven part and arranged to engage said rollers, to open said last-mentioned valves.

5. A fluid-operated clutch comprising, in combination, a driving part and a driven part, one of said parts being provided with a pump cylinder and a pressure chamber in communication with each other; an inlet and an exhaust valve connected with said cylinder, the latter valve being arranged to normally close such communication; a piston working in said cylinder and connected to the other part; a movable member connected with said cylinder and engaged with both valves; mechanism operated by the movement of the driving part for moving said member in one direction to open the inlet valve, and in the other direction to open the exhaust valve; and mechanism for controlling the flow of the operating fluid from the pressure chamber.

6. A fluid-operated clutch comprising, in combination, a driving part and a driven part, one of said parts being provided with a pump cylinder and a pressure chamber in communication with each other; an inlet and an exhaust valve connected with said cylinder, the latter valve being arranged to normally close such communication; a piston working in said cylinder and connected to the other part; a member pivotally connected with the cylinder and engaged with both valves; an endwise-movable member carried by the driving part and connected to said pivoted member; a cam carried by the driven part and connected with said endwise-movable member for moving the latter in one direction to open the inlet valve, and in the other direction to open the exhaust valve; and mechanism for controlling the flow of the operating fluid from the pressure chamber.

In testimony whereof, I affix my signature, in presence of two witnesses.

LOUIS GRÉMI.

Witnesses:
 DEAN B. MASON,
 SOLLET HENRY.